July 4, 1961 L. W. TOELKE 2,990,774
RETRIEVABLE CARRIER FOR A SHAPED CHARGE PERFORATOR
Filed Dec. 13, 1957 7 Sheets-Sheet 1
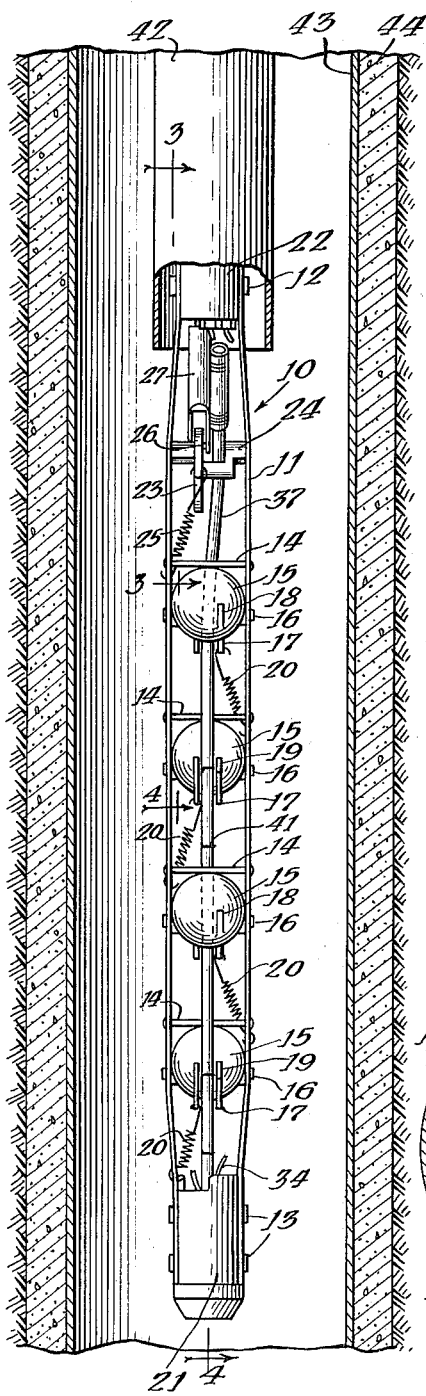
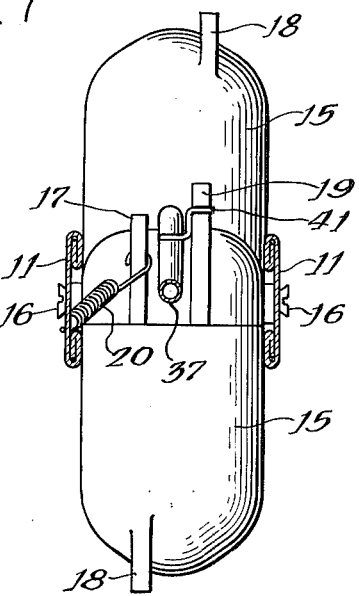
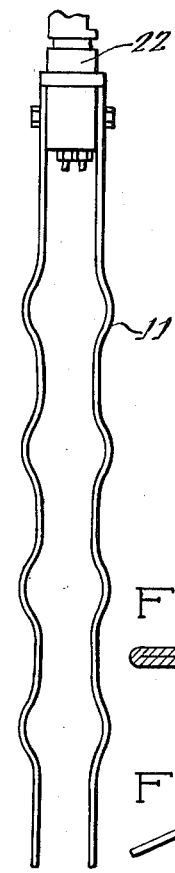
Inventor:
Lester W. Toelke
By Carl F. Peters
Attorney July 4, 1961 L. W. TOELKE 2,990,774
RETRIEVABLE CARRIER FOR A SHAPED CHARGE PERFORATOR
Filed Dec. 13, 1957 7 Sheets-Sheet 2
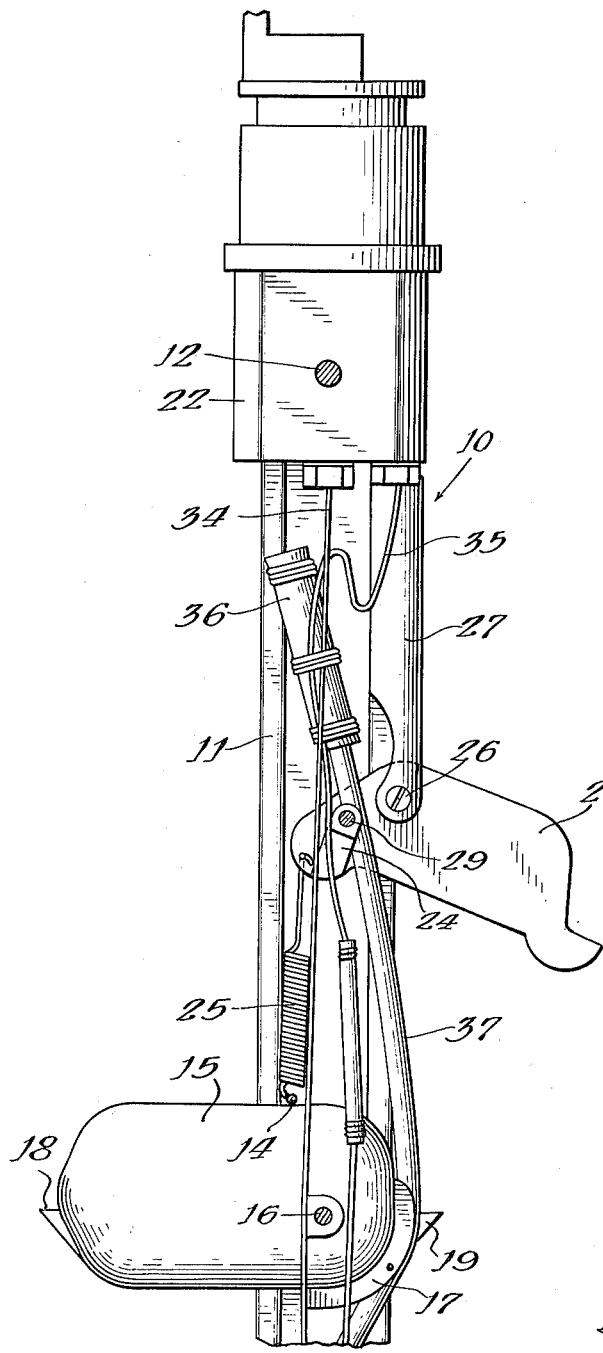
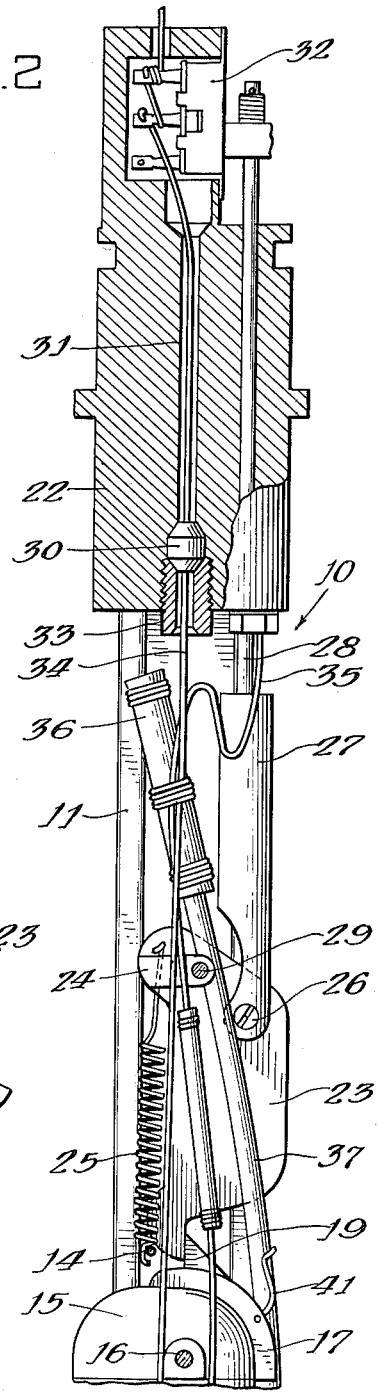
Inventor:
Lester W. Toelke
By: Earl F. Peters
Attorney

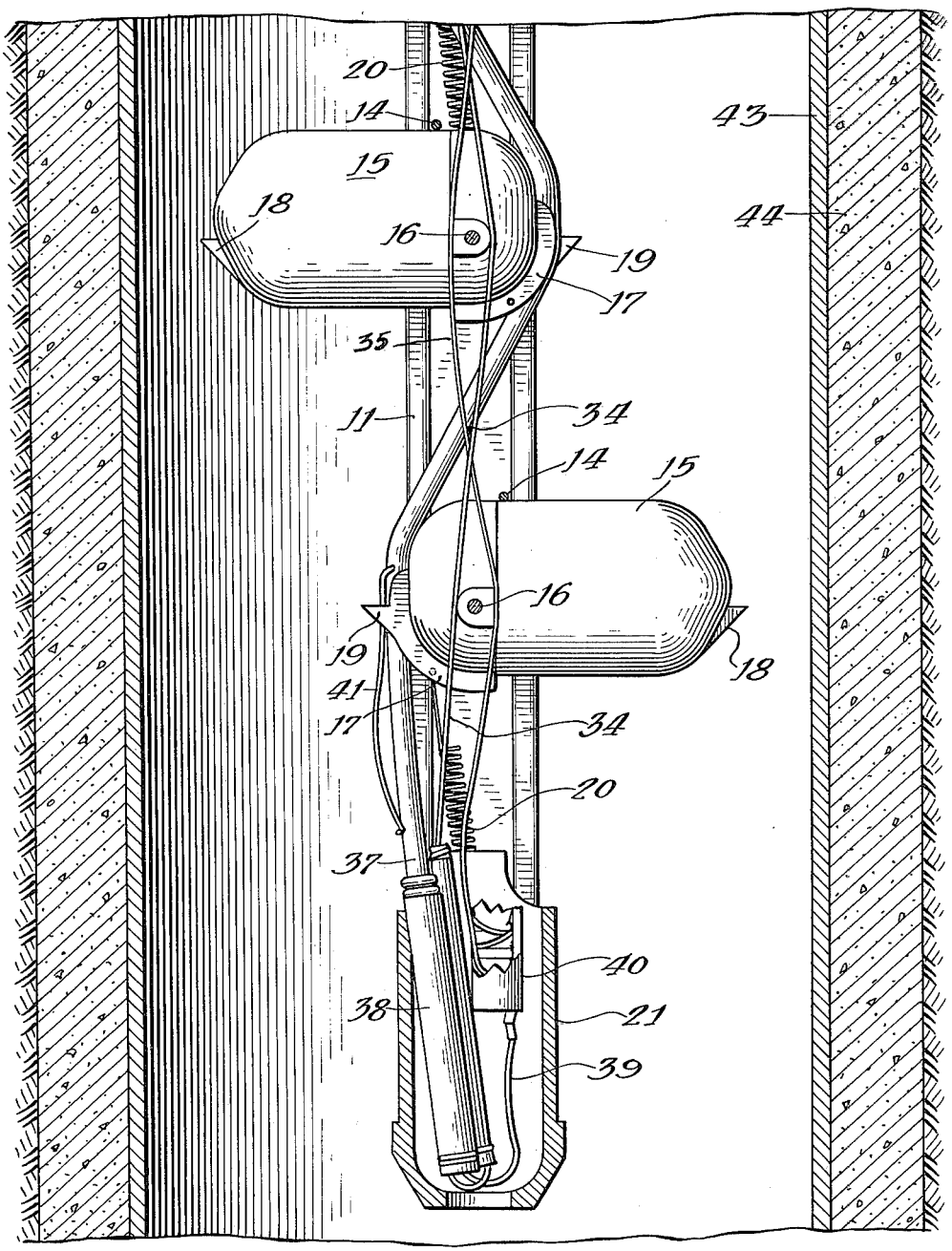

July 4, 1961 L. W. TOELKE 2,990,774
RETRIEVABLE CARRIER FOR A SHAPED CHARGE PERFORATOR
Filed Dec. 13, 1957 7 Sheets-Sheet 4
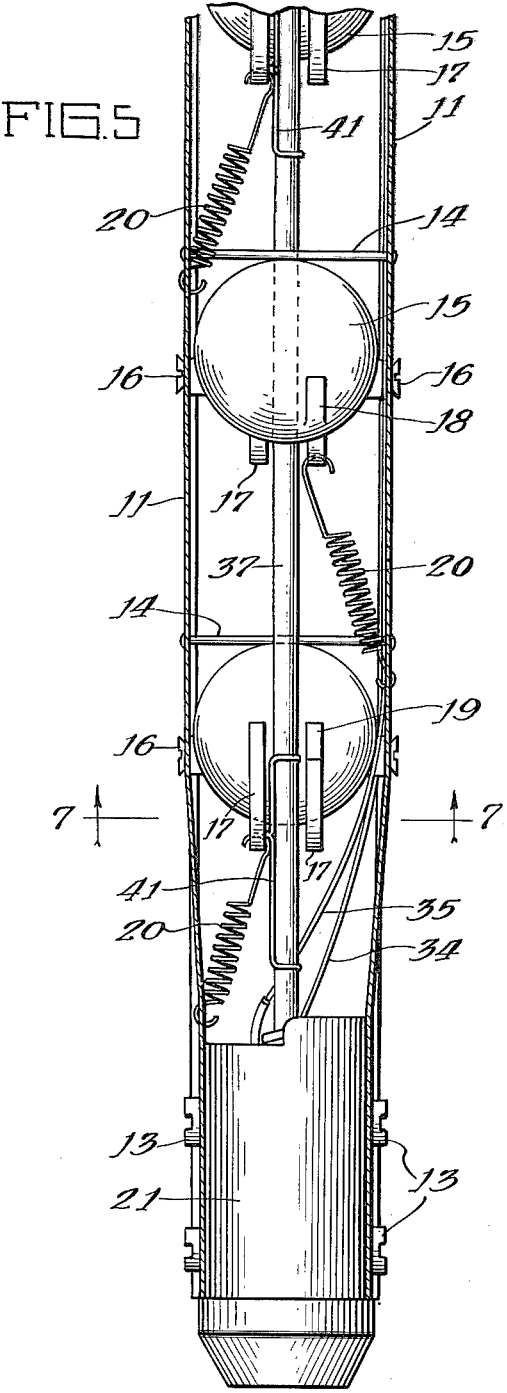
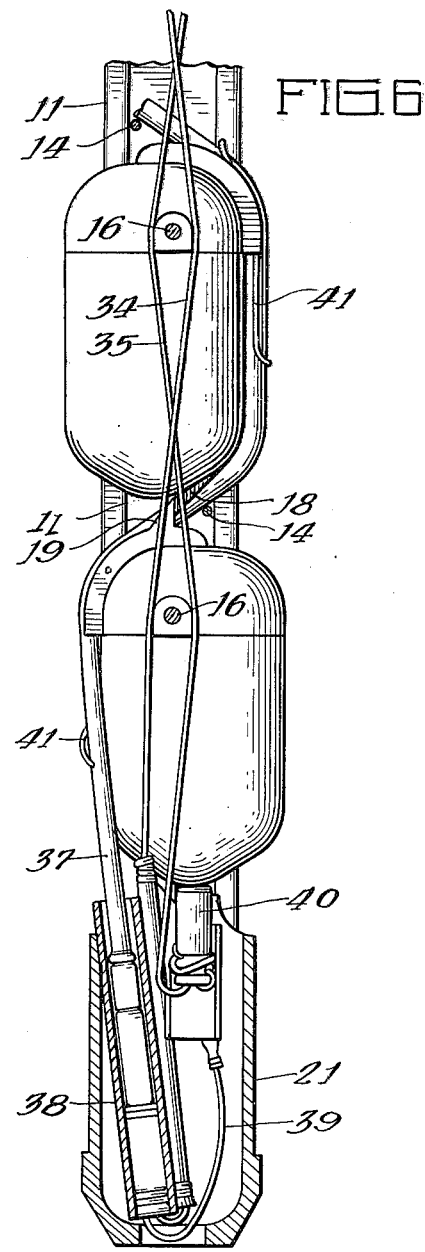
Inventor:
Lester W. Toelke
By: Carl F. Peters
Attorneys

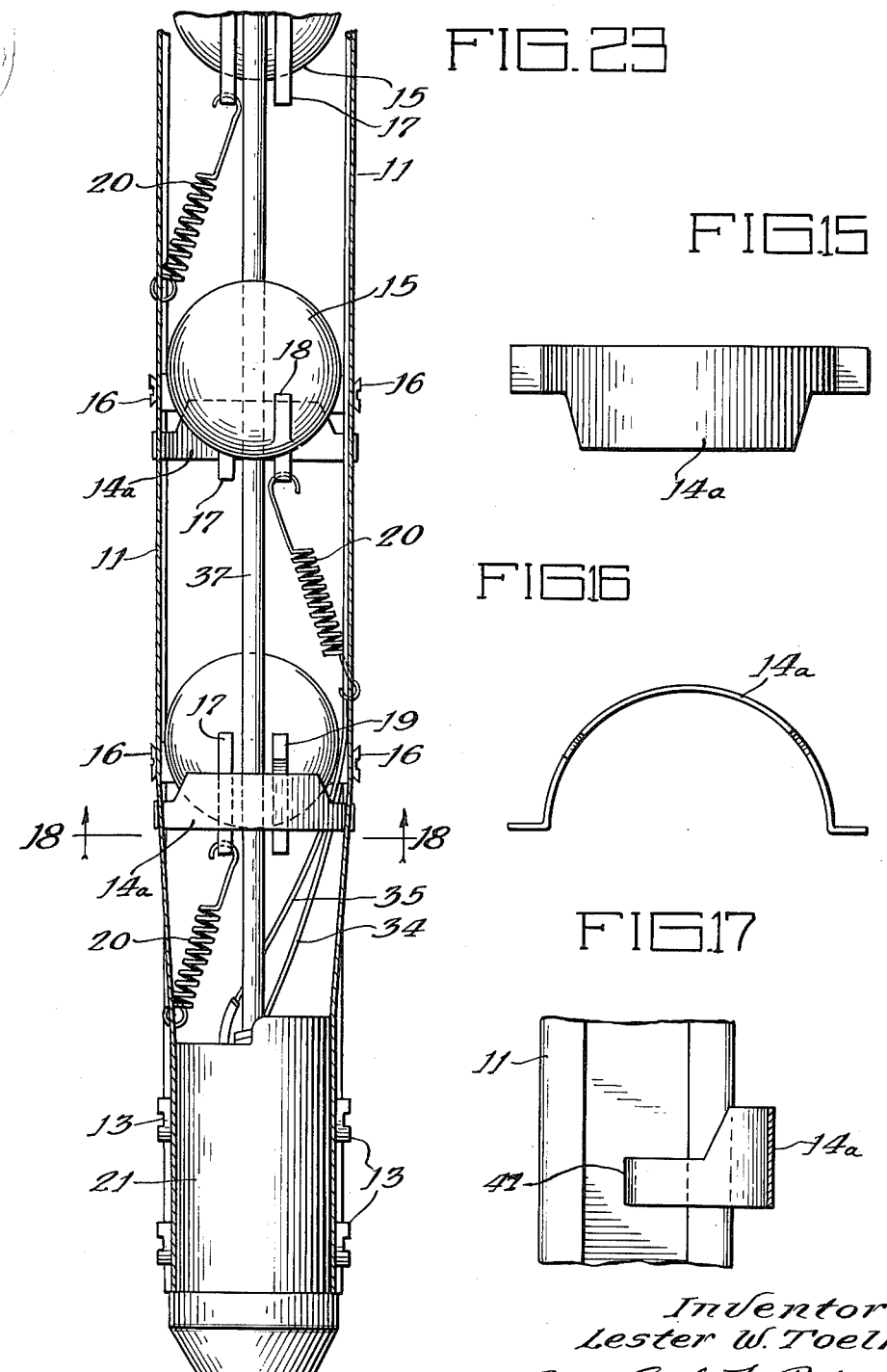

July 4, 1961 L. W. TOELKE 2,990,774
RETRIEVABLE CARRIER FOR A SHAPED CHARGE PERFORATOR
Filed Dec. 13, 1957 7 Sheets-Sheet 6
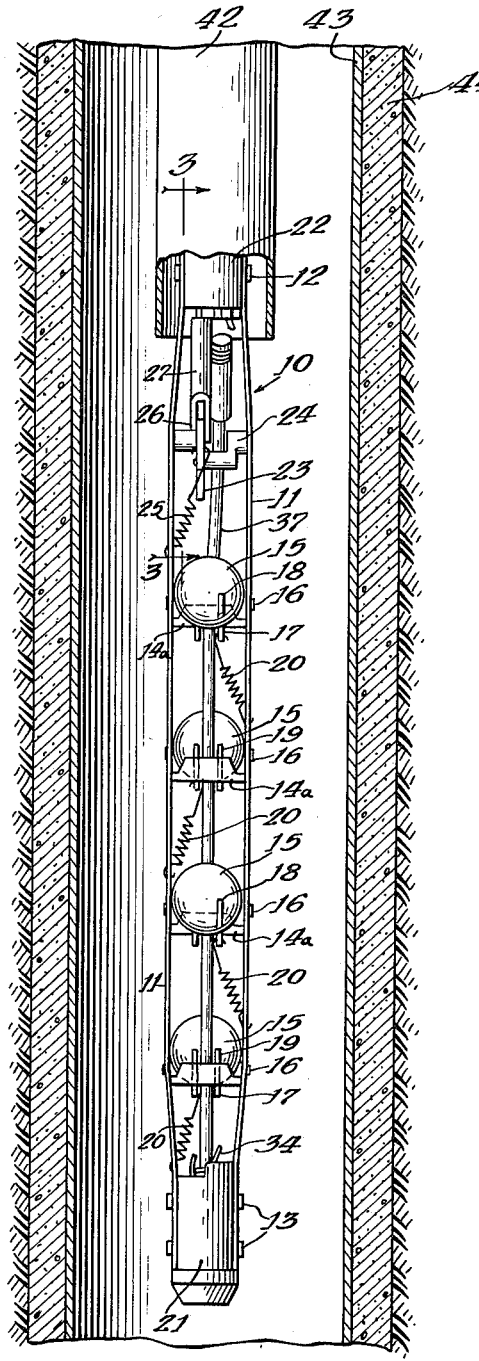
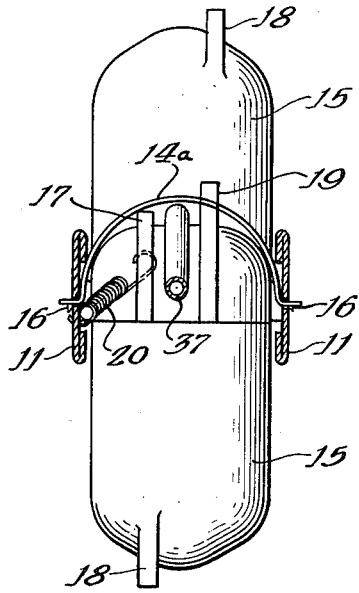
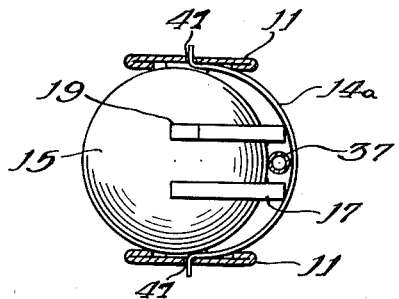
Inventor:
Lester W. Toelke
By: Carl F. Peters
Attorney

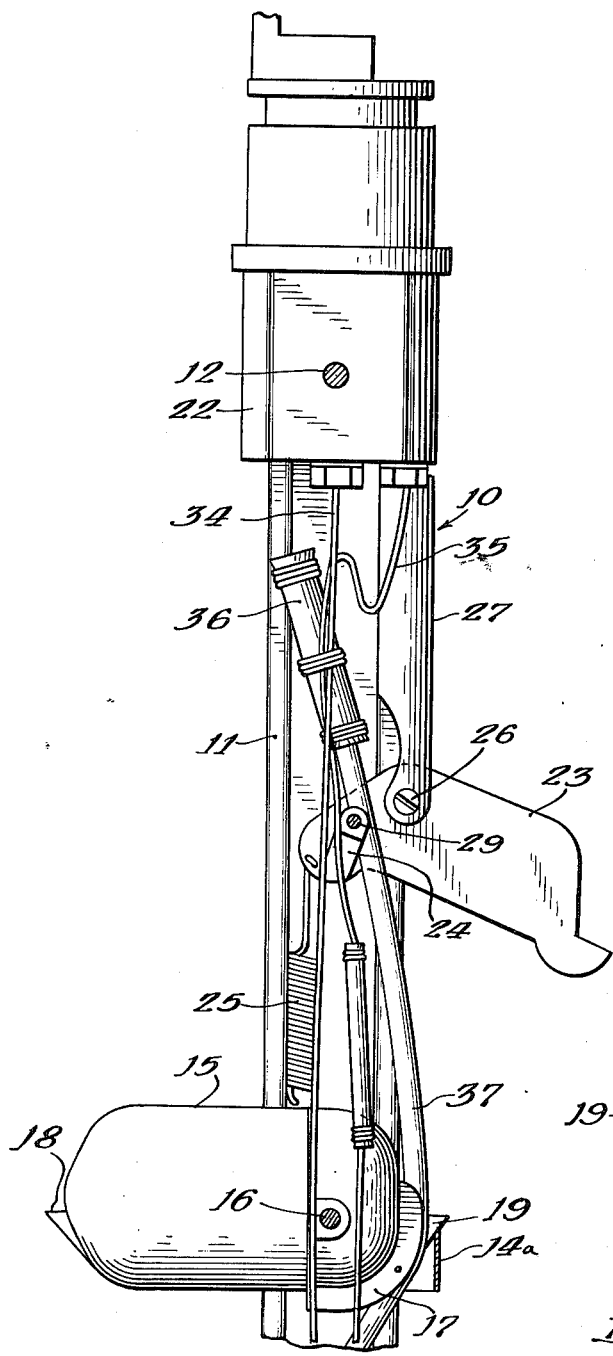
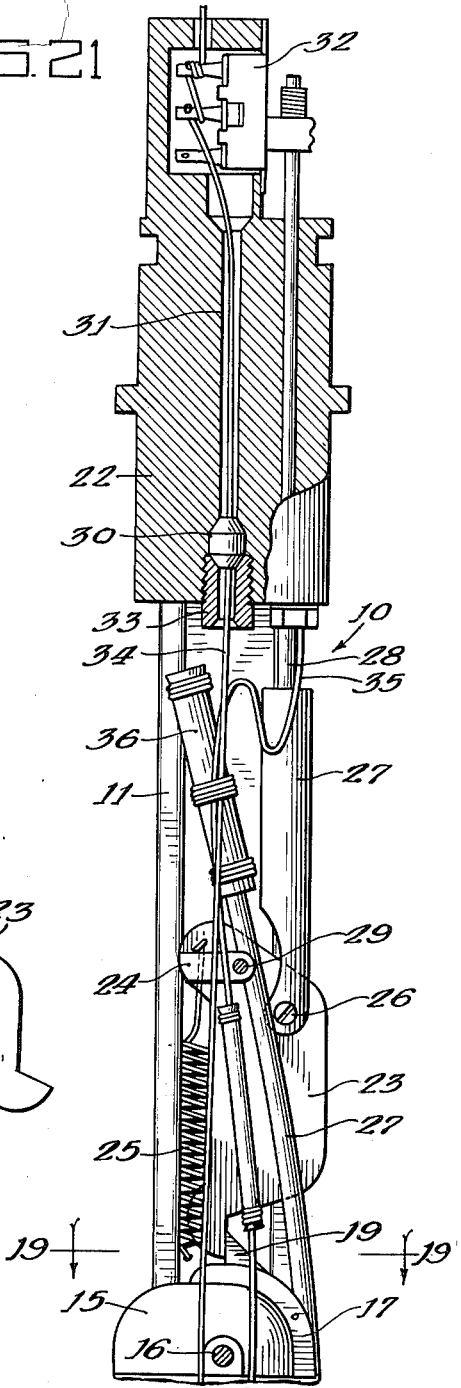

United States Patent Office 2,990,774
Patented July 4, 1961

2,990,774
RETRIEVABLE CARRIER FOR A SHAPED CHARGE PERFORATOR
Lester W. Toelke, Houston, Tex., assignor to Great Lakes Carbon Corporation, New York, N.Y., a corporation of Delaware
Filed Dec. 13, 1957, Ser. No. 702,612
9 Claims. (Cl. 102—20)

This invention relates to devices employed in perforating well bores and casing positioned therein, and particularly to an improved form of carrier assembly supporting so-called lined shaped charge explosive units of the "Jet" type. The carrier assembly of this invention is particularly adapted for the perforating of casing and well bores whereby the assembly may be lowered through tubing and withdrawn after perforating the well thereby obviating the necessity for withdrawing the tubing from the well bore prior to perforating operations. This operation is known as thru-tubing well completion.

The technique of perforating casing and well bores has been considerably advanced by the use of so-called explosive hollow "jet" or "lined shaped charges." The construction of these charges and their utilization in casing perforating equipment has been described by McLemore in the Oil and Gas Journal, December 28, 1946; and in U.S. Letters Patent Nos. 2,399,211, 2,494,256, 2,756,677 and 2,764,938. The latter two patents illustrate carriers in which shaped charge explosives are fixed in a strip carrier in a horizontal, firing position and no means are provided for pivoting or swinging the charges after the carrier is lowered into a well bore to the oil-producing zone. Therefore, such carriers cannot be employed in thru-tubing operations which is one of the main advantages of my invention.

Perforating with shaped charges has been recently adapted to thru-tubing or permanent type well completion methods. The advantages of perforating casing by passing a perforating gun through the oil production tubing and swinging the perforating charge into firing position are many. This type gun is commonly known as the thru-tubing perforating gun or "Swing Jet." This system has been described many times in various bulletins and magazine articles such as Huber and Tausch, "Permanent Type Well Completions," American Institute of Mining & Metallurgical Engineers Transactions, Vol. 198, (1953), page 11; AIME Paper #TP3961, Caldwell and Owen; also at a symposium held at the University of Houston in the fall of 1954; and in World Oil, December 1946. All of these articles describe perforating casing by passing an expendable shaped charge carrier through tubing. However, no one has previously successfully used a retrievable thru-tubing carrier for the Swing Jet (19 gram) charges.

A solid cylindrical steel carrier has been used with a very small 9 gram horizontally fixed charge but was abandoned because it swelled and could not be withdrawn from the tubing. Another thru-tubing swing jet carrier currently in use is a thin-walled aluminum tube with apertures or windows cut to accommodate and allow the charges to swing out for firing. This gun is designed to break up completely, leaving the carrier material (known as "junk") in the well. Other forms of carriers designed to go through tubing are exemplified in U.S. Patent No. 2,543,814 issued to Thompson, and British Patent No. 768,400. The design illustrated in the Thompson patent does not permit the carrier and charges to be withdrawn back up through the tubing if all or several of the charges should not fire. This difficulty is alleged to have been solved by the design illustrated in the aforesaid British patent. However, neither of the carriers illustrated in the Thompson and British patents can be retrieved back up through the tubing after the charges have been fired, except the rope socket and cable portions at the top end of the carrier. This is for the reason that the charges, upon exploding, break up the carrier and leave a considerable amount of "junk" in the hole which often interferes with subsequent down-hole operations. All thru-tubing carriers made to date are of the expendable type and no attempt has been made to retrieve any part of the carrier body.

It is generally thought that the "junk" remaining from the carrier causes most of the trouble with permanent type well completion methods. As a result, oil companies have not been as interested in this type of completion as they were originally. With my invention, by retrieving the "Swing Jet" carrier an entirely new appraisal has been given to this method of well completion.

Accordingly, it is a principal object of this invention to provide an improved type of carrier assembly for lined shaped charges which is particularly adaptable to be lowered into a well through tubing, thereby eliminating the necessity for withdrawing the tubing from the well prior to perforating the casing and the formation.

It is a further object of this invention to provide a relatively inexpensive yet durable carrier for shaped charge explosives which is completely retrievable from the well through the tubing after firing, leaving a minimum amount of material in the well resulting from the fragmentation of the shaped charge housings, the means used for fastening the charges to the carrier, and the bottom sub.

It is a further object of the invention to provide a carrier for shaped charge explosives which can be lowered into the well bore through oil-production tubing, after which the charges can be fired, and the carrier withdrawn back to the surface through the tubing irrespective whether all, several or one of the charges have failed to fire. Furthermore it can be determined from the type of slight distortion of the carrier body whether or not the charges have fired properly.

Generally, the improved carrier assembly of my invention comprises oppositely disposed and substantially parallel and uniformly spaced continuous strips of relatively thin sheet material which is resistant to shattering or fragmentation, a plurality of elongated shaped charge units positioned between and pivotally affixed to said strips, the longitudinal axes of said shaped charge units being substantially parallel to the longitudinal dimension of said strips, means for temporarily retaining said shaped charge units in substantially parallel alignment with the longitudinal dimension of the strips, means for releasing and swinging said shaped charge units and means for arresting them in a position substantially normal to the longitudinal edges of said strips, and means for detonating said shaped charge units to perforate the casing and formation.

The foregoing, as well as other objects of this invention will become apparent from the following detailed description and in view of the accompanying drawings which illustrate useful embodiments of the invention as well as several modifications thereof.

In the drawings:

FIGURE 1 is a view of one form of the carrier assembly in accordance with this invention showing the device as a whole, partly in section, after lowering the device through tubing positioned in a well bore, with the charges in firing position.

FIGURE 2 is a view similar to FIGURE 3, partly in section, showing the upper portion of the carrier assembly illustrating a system commonly used now with an expendable carrier.

FIGURE 3 is a sectional view taken along the line 3—3 of FIGURE 1;

FIGURE 4 is a view taken along the line 4—4 of FIGURE 1;

FIGURE 5 is an elevational view, partly in section, showing an enlarged bottom portion of the device in FIGURE 1;

FIGURE 6 is a view similar to FIGURE 4 detailing the bottom portion of the carrier assembly in a position suitable for lowering through tubing in a well bore;

FIGURE 7 is a view taken along the line 7—7 of FIGURE 5;

FIGURES 8 to 12 are cross-sectional views of modified forms of the carrier strips which are a feature of this invention;

FIGURE 13 is a view showing the appearance of the top portion of the carrier after firing the explosive charges;

FIGURE 14 is a plan view of the carrier positioned in tubing;

FIGURE 15 is an elevation of one form of charge arresting means which is a feature of my invention;

FIGURE 16 is a top view of the device shown in FIGURE 15;

FIGURE 17 is a fragmentary view in section showing the charge arresting means of FIGURE 15 fastened to the body of the charge carrier;

FIGURE 18 is a view taken along the line 18—18 of FIGURE 23;

FIGURE 19 is a view taken along the lines 19—19 of FIGURE 21;

FIGURES 20, 21, 22 and 23 are views similar to FIGURES 1, 2, 3 and 5, respectively, showing another form of the invention.

Referring first to FIGURE 1, which shows a preferred embodiment of my invention suitable for lowering through tubing for positioning in the well bore, the device is shown generally at 10 after having been lowered through tubing 42, shown partly withdrawn from the casing 43 which is backed up by concrete 44. The carrier assembly 10 consists of a pair of continuous, relatively thin metallic strips 11, which are disposed opposite each other in substantially parallel alignment with uniform spacing. The strips are spaced sufficiently apart to accommodate a number of explosive lined shaped charge units 15 which are swingably supported, usually approximately four inches apart, between the strips by means of pivots 16, such as metal screws. The strips 11 are constructed of relatively thin sheet material which are resistant to shattering or fragmentation by explosive impact such as ordinary mild steel 1/16" thick, as shown in FIGURE 11. Other impact and shatter-resistant materials may be used such as certain aluminum alloys, etc. The width of the strip will be made somewhat less than the longitudinal dimension of the shaped charge units 15. For example, when the carrier assembly is to be lowered into the well through tubing, the carrier including the charges will have a nominal diameter of 1¾", and when the charges are swung out the overall diameter will be about 4⅜". The strips 11 will be of sufficient width to cause them to contact the walls of the tubing, as shown in FIGURE 14, instead of allowing the charge case 15 or the Primacord 37 to rub. The larger O.D. of the strips 11 (diagonally across their corners) when assembled will prevent the charge or Primacord from rubbing, as illustrated in FIGURE 14.

The length of the strips 11 may be any suitable or desired length depending upon the area to be perforated. The side margins or longitudinal edges of the strips are suitably reinforced by rolling or crimping the edges of the strips, such as shown in FIGURES 9–11. This rolled edge also prevents jagged edges from occurring due to the explosive pressure on the strip. If such jagged edges were present the strip might hang up on the tubing when it was pulled from the casing into the tubing. Therefore, it is imperative that a smooth strip edge exist after the gun is fired. This smooth edge also enables faster descent while in the tubing.

The carrier is adapted to support a number of explosive shaped charged perforating units 15 of the type generally referred to previously herein. Only the exterior or casing portion of these charges is shown herein for purposes of illustration.

The carrier strips 11 are fastened at the top to firing head 22. A bottom sub 21 may also contain weights (not shown) to facilitate lowering the carrier assembly into the well.

As shown particularly in FIGURE 6, the shaped charge units 15 are placed between the carrier strips 11 on pivots 16, and are temporarily positioned longitudinally of the strips, and end to end with respect to each other. The opposite ends of the casing of each shaped charge are provided with projections 18 and 19 which interlock with corresponding projections on the other cases. An explosive charge 40 is positioned in a recess in the bottom firing sub 21 in contact with projection 18 of the lowermost charge and all of the charge cases are held in alignment by interlocking projections 19 while the carrier assembly is lowered into the well through the tubing. There is further provided means for swinging the shaped charge units into firing position substantially normal to the longitudinal edges of the carrier strips 11, in the form of springs 20 and 25. One end of the spring is passed through a hole in the strip 11 and another is passed through a hole in a lug or raised shoulder 17 on the rear face of the charge casing 15. When all of the charges are lined up longitudinally of the strips, as shown in FIGURES 2 and 6, the springs 20 and 25 are under tension. The spring on the uppermost casing is attached to a release arm 23 which actuates a mechanism consisting of a clevis 27 connected to the release arm 23 by means of a pivot 26, the clevis 27 being in turn connected to clevis rod 28 which is attached to a two position assembly 32. In the normal position for lowering the carrier assembly into the well through tubing, the switch assembly 32 is in a position so that the explosive charge 40, positioned against the lowermost casing 15, may be fired electrically by means of an insulated electric wire 35 which runs longitudinally of and between the strips 11. The firing of the charge in 40 fragmentizes its case and permits all of the charge casings 15 to swing upwardly due to the tension on each casing spring.

There is further provided between each of the charge casings 15 a means for arresting the casings in a position substantially normal to the longitudinal edges of the strips 11, in the form of straight or curved arresting bars 14 consisting of metal wire or pins. These bars are positioned transversely between and are in non-rigid engagement with the oppositely disposed faces of the strips 11 and act as stops for the casings 15 when they are swung upwardly. One such stop bar is provided for each shaped charge unit.

When the charges 15 are swung into contact with the arresting bars 14 they are ready to be fired. This is accomplished by electrically energizing wire 34 which runs from the two-position switch 32 longitudinally between the strips 11 to a blasting cap and booster assembly 38. The firing of this blasting cap detonates a length of Primacord 37 which also runs longitudinally of and between the carrier strips 11 and in contact with the rear face of each shaped charge casing 15. In this embodiment of the invention, the Primacord is maintained in contact with the casings by means of spring clips 41 anchored to lugs 17. The blasting cap assembly 38 and casing release charge 40 are attached to a ground wire 39.

The carrier strips 11 are fastened to an upper firing head 22 by means of bolts 12, and to a bottom firing sub 21 by means of bolts 13. The electrical lead wires 34 and 35 which energize the squib 40 and the blasting cap and booster assembly 38 enter the upper firing head assembly 22, lead wire 34 entering through central bore 31. Access of well fluids to this bore and to the two-position switch assembly 32 in the upper portion of the upper firing head is prevented by means of a seal 30 fastened in position by compression nut 33. There is further provided a closure sleeve and seal 36 for the end of the Primacord; the blasting cap and booster assembly 38 is wrapped and sealed to exclude well fluids. Squib 40 is in a hydrostatic, pressure-proof sealed, unitized container.

The detonating train for the shaped charge units consists of a length of flexible fluid- and pressure-resistant Primacord 37 which runs lengthwise and inside of the carrier strips 11 passing successively over and in contact with the rear face of the several perforating units as shown in FIGURES 3, 4, 6 and 7. The rear ends of the shaped charged casings are provided with grooves formed by raised shoulders 17 to receive the Primacord which is retained in contact with the casings by means of spring clips 41. In the arrangement illustrated in the drawings the detonating train is fired from its lower end but it should be understood that either top or bottom firing arrangements may be used successfully.

In operation the carrier assembly having the perforating units pivotally mounted therein and longitudinally aligned as shown in FIGURES 2 and 6 is connected to an upper firing head 22 and bottom firing sub 21. The assembly is then lowered by means of a socket head and cable containing an electrical conductor (details not shown) through tubing 42, although it should be understood that this device can also be used for lowering directly into casing. When the assembly has passed the bottom open end of the tubing, current is supplied when desired from the surface through wire 35 to the charge 40 which, upon detonation, fragmentizes and releases the lowermost shaped charge unit 15, permitting the remaining charges to swing upwardly to a horizontal position where they engage the stop bars 14. The switch 32 is automatically moved and when it is desired to fire the gun, current is supplied from the surface through wire 34 to blasting cap and booster assembly 38 which sets off the Primacord train 37 thereby successively causing all of the shaped charge units 15 to detonate. This detonation fragmentizes the perforating units 15 as well as the stop bars 14, spring clips 41 and springs 20 and 25. While the gaseous jets from the perforating units 15 are primarily directed horizontally against and through the casing 43 there is a substantial radial force developed which acts against the strips 11. By providing flexible strips 11, these will be distorted slightly in each immediate charge area resulting in a slight deformation as shown in FIGURE 13. This action is particularly beneficial to the gun operator because it enables him to ascertain whether all of the charges have fired and adequate perforations have been obtained in the casing. When the charges explode improperly, the charge case will fragmentize without perforating the casing but in such event no deformation in that particular area of the carrier strips is observed. It will be seen that the carrier strips, while slightly bowed in each charge area, are completely intact and the carrier assembly may be readily withdrawn from the well through the tubing with the firing head 22 and other non-expendable parts intact. After being withdrawn from the well the carrier strips may then be discarded.

FIGURES 8 to 12 illustrate other suitable shapes for strips of the carrier assembly with which this invention is concerned. FIGURE 8 shows a flat metal strip 46 which, in FIGURES 9, 10, and 11 has been bent back or crimped along the longitudinal edges to form reinforcing beads. FIGURE 12 shows another modification of carrier strip 48.

In FIGURES 20, 21, 22, 23, 18 and 19 is shown another embodiment of my invention in which all of the features shown in FIGURES 1, 2, 3, 5, 7, and 14, respectively, are used with the exception that the arresting or stop bar 14 and the Primacord hold-down clip 41 illustrated in the previously described embodiment, have been replaced with an arresting bar 14a of arcuate shape. In the particular form illustrated, this arcuate shaped arresting bar is in the shape of a flat metal clip which can be constructed of aluminum, magnesium or other material, and is transversely positioned between the strips 11 in such a manner as not to rigidly restrain the strips when the charges are fired, for example by means of slots 47 in oppositely disposed position on each of the parallel strips 11. As shown in the drawings, the curve of the arresting clips 14a extend beyond the plane formed by the longitudinal edges of the strips 11 to engage and arrest the charge units 15 when the latter are swung from a vertical to a horizontal firing position. As shown in FIGURES 15 and 16, this arresting clip has projections which engage the slots 47 of the carrier strip 11. I prefer to have a non-rigid fastening. This clip further serves to hold the Primacord detonating train 37 against the firing end of the shaped charge units 15 thereby eliminating the necessity for using the spring clip 41 in the previously described embodiment. Upon firing of the shaped charge units, the arresting clip 14a will fragmentize and the carrier will be withdrawn through the tubing in the form shown in FIGURE 13. This arcuate shaped arresting bar also facilitates faster loading of the carrier with the shaped charge units and will give somewhat more protection to the Primacord detonating train than does the stop bar 14 shown in FIGURE 1 when the carrier is lowered through the tubing.

A further advantage in the use of the foregoing assembly lies in the fact that the Primacord detonating train is not required to be threaded through any apertures in the carrier strips thereby eliminating the possibility of cutting and wetting the Primacord, resulting in misfiring.

The carrier assembly of this invention may be made in any desired length and may be made up of interconnected sections to obtain a length sufficient to support any desired number of perforating units.

It will thus be seen that this invention provides a retrievable perforating carrier assembly for shaped charge units which has sufficient rigidity to support weight while nevertheless providing sufficient flexibility to pass tight places in the tubing. The charges may be positioned to shoot uni-directional or in opposite directions, the latter being the type generally used.

While the embodiments of the invention illustrated in the drawings show the release of the aligned charges from a longitudinal to a horizontal position by means of an explosive charge 40 it should be understood that the charges can also be released by electrical means. Other changes or alterations may be made in the details of the invention within the scope of the appended claims without deviating from the spirit of the invention.

This application is a continuation-in-part of applicant's co-pending application Serial No. 658,613 filed May 13, 1957, and now abandoned.

I claim:

1. A retrievable carrier for a shaped charge perforator comprising a single pair of oppositely disposed and substantially parallel and uniformly spaced continuous strips of relatively thin flexible sheet material which are impact-resistant to allow explosive deformation without fragmenting, a plurality of elongated shaped charge units positioned between and pivotally affixed to said strips, the longitudinal axes of said shaped charge units being substantially parallel to the longitudinal dimension of said strips, means for temporarily retaining said shaped charge units in substantially parallel alignment with the longitudinal dimension of said strips, means for swinging said shaped charge units from the aforesaid position to a position substantially normal to the longitudinal edges of said strips, arresting bars positioned transversely between each shaped charge unit and in non-rigid engagement with the oppositely disposed faces of said strips to arrest said unit when it is swung into a position substantially normal to the longitudinal edges of said strips, means for connecting said strips to a lowering means, and means for detonating said shaped charge units.

2. A retrievable carrier for a shaped charge perforator comprising a single pair of oppositely disposed and substantially parallel and uniformly spaced continuous strips of relatively thin flexible sheet material which are impact and shatter-resistant to allow explosive deformation without fragmenting, a plurality of elongated shaped charge units positioned between and pivotally affixed to said strips, the longitudinal axes of said shaped charge units being substantially parallel to the longitudinal dimension of said strips, means for temporarily retaining said shaped charge units in substantially parallel alignment with the longitudinal dimension of said strips, means for swinging said shaped charge units from the aforesaid position to a position substantially normal to the longitudinal edges of said strips, arresting bars positioned transversely between each shaped charge unit and in non-rigid engagement with the oppositely disposed faces of said strips to arrest said unit when it is swung into a position substantially normal to the longitudinal edges of said strips, means for connecting said strips to a lowering means, and a detonating train extending longitudinally of and between said strips and maintained in contact with said charge units.

3. A retrievable carrier for a shaped charge perforator adapted to be lowered through tubing comprising a single pair of oppositely disposed and substantially parallel and uniformly spaced continuous strips of relatively thin, flexible sheet metal which is impact and shatter-resistant to allow explosive deformation without fragmenting, reinforcing elements disposed longitudinally along the side edges of said strips, a plurality of elongated shaped charge units positioned between and pivotally affixed to said strips, the longitudinal axes of said shaped charge units being substantially parallel to the longitudinal dimension of said strips, means for temporarily retaining said shaped charge units in substantially parallel alignment with the longitudinal dimension of the strips, means for swinging said shaped charge units from the aforesaid position to a position substantially normal to the longitudinal edges of said strips, arresting bars positioned transversely between each shaped charge unit and in non-rigid engagement with the oppositely disposed faces of said strips to arrest said unit when it is swung into position substantially normal to the longitudinal edges of said strips, means for connecting said strips to a lowering means, and a Primacord detonating train extending longitudinally of and between said strips and maintained in detonating contact with said charge units by means of clips anchored to the rear face of the charge units.

4. A device according to claim 3 wherein the metal strips are approximately 1/16" thick and each longitudinal edge of said strips has been bent inwardly upon itself to form a reinforcing element.

5. A device according to claim 2 wherein the detonating train is maintained in contact with the charge units by means of spring clips anchored to the rear face of the charge units.

6. A retrievable carrier for a shaped charge perforator comprising a single pair of oppositely disposed and substantially parallel and uniformly spaced continuous strips of relatively thin flexible sheet material which are impact-resistant to allow explosive deformation without fragmenting, a plurality of elongated shaped charge units positioned between and pivotally affixed to said strips, the longitudinal axes of said shaped charge units being substantially parallel to the longitudinal dimension of said strips, means for tempporarily retaining said shaped charge units in substantially parallel alignment with the longitudinal dimension of said strips, means for swinging said shaped charge units from the aforesaid position to a position substantially normal to the longitudinal edges of said strips, bars of arcuate shape positioned transversely between each shaped charge unit and in non-rigid engagement with the oppositely disposed faces of said strips to arrest said unit when it is swung into a position substantially normal to the longitudinal edges of said strips, means for connecting said strips to a lowering means, and means for detonating said shaped charge units.

7. A retrievable carrier for a shaped charge perforator comprising a single pair of oppositely disposed and substantially parallel and uniformly spaced continuous strips of relatively thin flexible sheet material which are impact-resistant to allow explosive deformation without fragmenting, a plurality of elongated shaped charge units positioned between and pivotally affixed to said strips, the longitudinal axes of said shaped charge units being substantially parallel to the longitudinal dimension of said strips, means for temporarily retaining said shaped charge units in substantially parallel alignment with the longitudinal dimension of said strips, means for swinging said shaped charge units from the aforesaid position to a position substantially normal to the longitudinal edges of said strips, bars of arcuate shape positioned transversely between each shaped charge unit and in non-rigid engagement with the oppositely disposed faces of said strips and extending beyond the plane formed by the longitudinal edges of said strips to engage the charge units when they are swung into firing position.

8. A retrievable carrier for a shaped charge perforator adapted to be lowered through tubing comprising a single pair of oppositely disposed and substantially parallel and uniformly spaced continuous strips of relatively thin, flexible sheet material which are impact-resistant to allow explosive deformation without fragmenting, reinforcing elements disposed longitudinally along the side edges of said strips, a plurality of elongated shaped charge units positioned between and pivotally affixed to said strips and being in frictional contact with said reinforcing elements, the longitudinal axes of said shaped charge units being substantially parallel to the longitudinal dimension of said strips, means for temporarily retaining said shaped charge units in substantially parallel alignment with the longitudinal edges of said strips, means for swinging said shaped charge units from the aforesaid position to a position substantially normal to the longitudinal edges of said strips, arresting bars of arcuate shape transversely positioned between said strips, in non-rigid engagement with the oppositely disposed faces of said strips and between each shaped charge unit and extending beyond the plane formed by the longitudinal edges of said strips to arrest said units when they are swung into firing position substantially normal to the longitudinal edges of said strips, means for connecting said strips to a lowering means, and means for detonating said shaped charge units.

9. A retrievable carrier for a shaped charge perforator adapted to be lowered through tubing comprising a single pair of oppositely disposed and substantially parallel and uniformly spaced continuous strips of relatively thin, flexible sheet material which are impact-resistant to allow explosive deformation without fragmenting, reinforcing elements disposed longitudinally along the side edges of said strips, a plurality of elongated shaped charge units positioned between and pivotally affixed to said strips and being in frictional contact with said reinforcing elements, the longitudinal axes of said shaped charge units being substantially parallel to the longitudinal dimension of said strips, means for temporarily retaining said shaped charge units in substantially parallel alignment with the longitudinal edges of said strips, means for swinging said shaped charge units from the aforesaid position to a position substantially normal to the longitudinal edges of said strips, arresting bars of arcuate shape positioned transversely between each shaped charge unit and in non-rigid engagement with the oppositely disposed faces of said strips and having projections which engage slots in said carrier strips, to arrest said units when they are swung into firing position substantially normal to the longitudinal edges of said strips, means for connecting said strips to a lowering means, and means for detonating said shaped charge units.

References Cited in the file of this patent

UNITED STATES PATENTS

| | | |
|---|---|---|
| 2,543,814 | Thompson et al. | Mar. 6, 1951 |
| 2,644,519 | Kanady | July 7, 1953 |
| 2,664,156 | Allen | Dec. 29, 1953 |
| 2,756,677 | McCullough | July 3, 1956 |
| 2,764,938 | Harcus | Oct. 2, 1956 |
| 2,859,697 | Long | Nov. 11, 1958 |

FOREIGN PATENTS

| | | |
|---|---|---|
| 1,029,798 | France | Mar. 11, 1953 |
| 200,153 | Australia | Nov. 9, 1955 |
| 777,547 | Great Britain | June 26, 1957 |

Disclaimer and Dedication

2,990,774.—*Lester W. Toelke*, Houston, Tex. RETRIEVABLE CARRIER FOR A SHAPED CHARGE PERFORATOR. Patent dated July 4, 1961. Disclaimer and dedication filed Nov. 14, 1967, by the assignee, *Borg-Warner Corporation*.

Hereby disclaims and dedicates to the Public the terminal portion of the term of the patent subsequent to Dec. 31, 1966.

[*Official Gazette March 26, 1968.*]